United States Patent [19]

LeJay

[11] 4,054,757
[45] Oct. 18, 1977

[54] CONFERENCE CIRCUIT USING PCM TECHNIQUES

[75] Inventor: Augustin LeJay, Verrieres le Buisson, France

[73] Assignee: International Standard Electric Corporation, New York, N.Y.

[21] Appl. No.: 750,326

[22] Filed: Dec. 13, 1976

[51] Int. Cl.² ............................................ H04M 3/56
[52] U.S. Cl. .................................................. 179/18 BC
[58] Field of Search .................................... 179/18 BC

[56] References Cited
U.S. PATENT DOCUMENTS

| | | | |
|---|---|---|---|
| 3,908,089 | 9/1975 | Picandet | 179/18 BC |
| 3,984,643 | 10/1976 | Inrig et al. | 179/18 BC |

Primary Examiner—William C. Cooper
Attorney, Agent, or Firm—J. B. Raden; M. M. Chaban

[57] ABSTRACT

Conference circuit which uses a read/write memory divided into groups of memory lines, with each group corresponding to a conference. Each line is assigned to store data from a single subscriber and to store the code words coming from that subscriber. The memory stores non-linear subscribers' codes. The codes are expanded and the codes of other subscribers in the same conference are added and compressed for transmission and decoding at any other exchange of other conference members. The conference circuit may be inserted in one position of a group of junction circuits or may be placed in a subscriber line concentrator.

5 Claims, 7 Drawing Figures

CONFERENCE CIRCUIT USING PCM TECHNIQUES

This invention concerns a conference circuit permitting several subscribers to be interconnected in a switching system using pulse code modulation, or PCM.

It is sometime useful, in a switching system, to be able to connect more than two subscribers at the same time. Devices already exist, often called conference circuits, which accomplish this operation. However, these circuits usually require particular control signals and often numerous other circuits.

The specific object of this invention is a simple conference circuit whose operation requires clock signals only, and no special control signals.

The conference circuit according to the invention has the particular advantage of being adaptable to the already existing switch which requires no structural modification.

It is provided, according to the invention, a conference circuit designed to interconnect several subscribers in a PCM switching network which operates with a repetition period or frame T containing $m$ successive time slots $t$, and having first means to store non-linear subscribers' codes received during the $m$ time slots $t$, second means to expand the said non-linear codes, third means to add the codes of the various subscribers involved in the same conference, and fourth means to compress the linear addition codes, characterized in that the said first storage means contain a read/write memory of n lines divided into $K$ of $I$ consecutive lines ($m = K \cdot I$), each group corresponding to a conference, the $m$ lines of the said memory being written at the rate of one line pr time slot $t$, and in that during each time slot $t$, the $I$ lines of the group including the written line are read successively, with the said memory being addressed in the period. $t/I$.

Other objects, characteristics and advantages will be brought out in the following description of an embodiment, the said description being co-related with the attached drawings in which.

Figure 1:
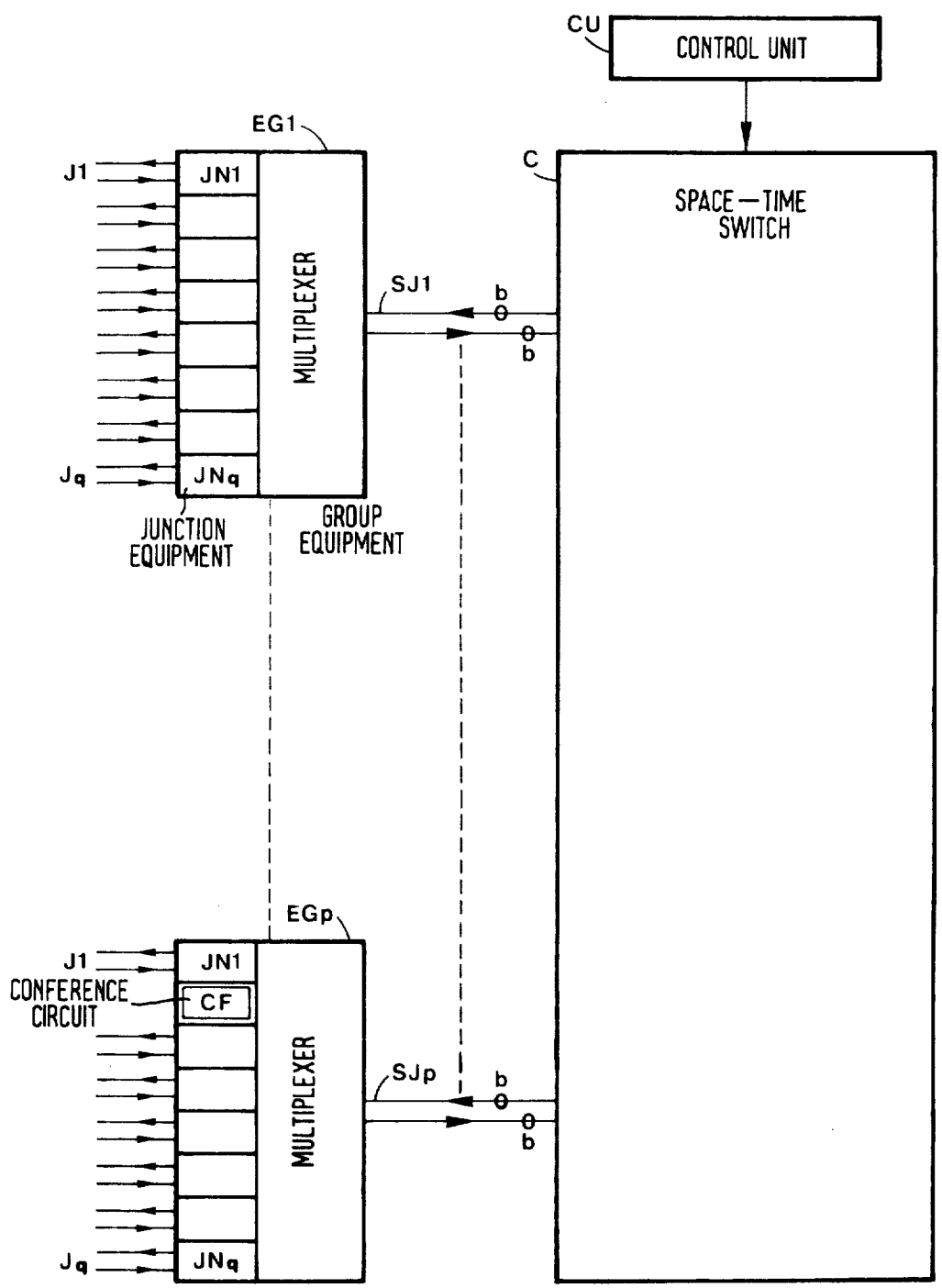
FIG. 1 shows a general diagram of a PCM switching center.

FIG. 1 shows a general diagram of a PCM switching center as well as the possible, though not unique, location of the conference circuit according to the invention. This switching center contains a space-time switch C connected to $p$ group equipments EG1 to EG$p$. Each group equipment contains $q$ junction equipments JN1 to JN$q$ connected to a multiplexing unit M. The $q$ junction equipments JN1 to JN$q$ of each group equipment receive, from $q$ multiplex junctions J1 to J$q$ respectively, $m$ successive coded words during a repetition period or frame T. Each of these $m$ coded words occupies a particular time slot $t$, or time channel, within the frame T, and contains $b$ bits transmitted serially over the junctions. The different coded words transmitted successively in the same time channel are samples of the analog speech signal of a subscriber. In order to improve transmission quality, these samples are coded non-linearly, using compression, the coded characteristic being approximate logarithmic curve. The following numerical values are commonly used in practice:

$b$ = 8 bits
$m$ = 32 coded words
$t$ = 3.9 μs
$T$ = 125 μs
$q$ = 8 multiplex junctions.

The function of the junction equipments is mainly to convert the transmission code (for example code HDB3) used on the multiplex junctions into a binary code, to synchronize the received bits and to perform a serial-to-parallel conversion of the coded words. The multiplexing unit M receives the coded words in parallel form delivered by the $q$ junction equipments JN1 to JN$q$ and performs a super-multiplexing: it successively delivers $q \cdot m$ words coded in parallel form during one frame T. The multiplexing units M of the group equipment EG1 to EG$p$ are connected to the switch C respectively through multiplex super-junctions SJ1 to SJ$p$.

The group equipments EG1 to EG$p$ have been described in relation to the multiplex junction → switch direction of transmission, but these equipments are designed to carry out the reverse operations in the switch → multiplex junction direction. Thus, at each time slot $t$, a coded word is transmitted in both directions, in serial form, between each junction equipment and its associated junction. The multiplex junctions and super-junctions contain separate ways for each direction of transmission. The space-time switch C, controlled by a control unit CU, connects group equipment to group equipment through space switching elements (crosspoints) and time channel to time channel through the time switching elements (speech memories).

The conference circuit according to the invention, which is called CF in FIG. 1, can be placed in the group equipment instead of a junction equipment. It is connected to the multiplexing unit M in the same way as the junction equipments. A conference call between several subscribers is established by connecting each of the subscribers to the conference circuit CF through switch C. Thus, for a subscriber in conference, the conference circuit CF receives, during a given time slot, through switch C, a coded word corresponding to a sample of the speech signal emanating from this subscriber. It delivers to this same subscriber, through the switch, a coded word corresponding to the sum of the speech sample codes emanating from the other subscribers participating in the conference. As it will be seen later on, several separate conferences can be established simultaneously by the same conference circuit. The operation of the conference circuit CF is controlled by clock signals. No other control signal is required. The establishment of a conference between several given subscribers is determined by the choice of connections made in switch C under the control of the control unit CU.

Installing the conference circuit CF instead of a junction equipment, in a group equipment, is not the only possible position. The conference circuit could also be placed, for example, at the end of a multiplex junction, in a subscriber line concentrator. The number of conference circuits connected to the switch C varies according to requirements.

Figure 2:
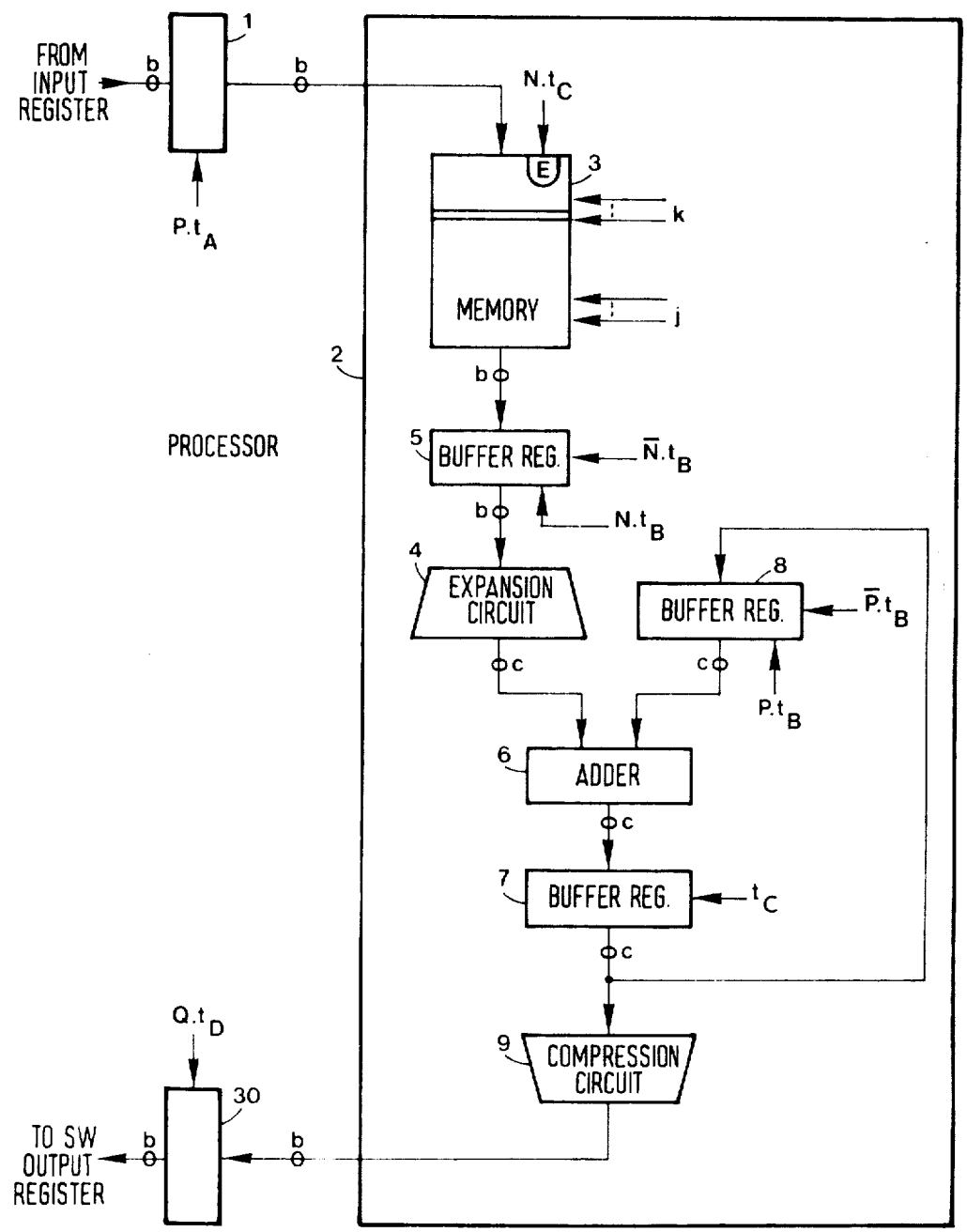
FIG. 2 is a diagram of the conference circuit according to the invention.

FIG. 2 shows a diagram of the conference circuit according to the invention. It includes an input register 1 successively storing the coded words of b bits received from each of the subscribers in conference through the space-time switch, a processing circuit 2 adding the coded words of the other subscribers participating in the conference, and an output register 30 delivering in succession the added codes to the subscribers in conference, through the switch. The coded words are transmitted in parallel form inside the conference circuit.

The processing circuit 2 includes a read/write memory containing m lines of b bits. Each line is assigned to a single subscriber and stores the various coded words coming from this subscriber. The b outputs of this memory are connected to an expansion circuit 4 through a buffer register 5. The said expansion circuit converts the words of b bits coded non-linearly into words of c bits ($c > b$) coded linearly. If $b = 8$, we shall make $c = 12$. An adder 6 of c output bits receives, on the one hand the coded words delivered by the expansion circuit 4, and on the other hand the coded words corresponding to the result of the preceding addition. For this purpose, the output of the said adder 6 is connected to one of its inputs through two buffer registers 7 and 8. A compression circuit 9, placed at the output of buffer register 7, converts the added words of c bits coded linearly into words of b bits coded non-linearly, in order to transmit them to the switch.

Figure 3:
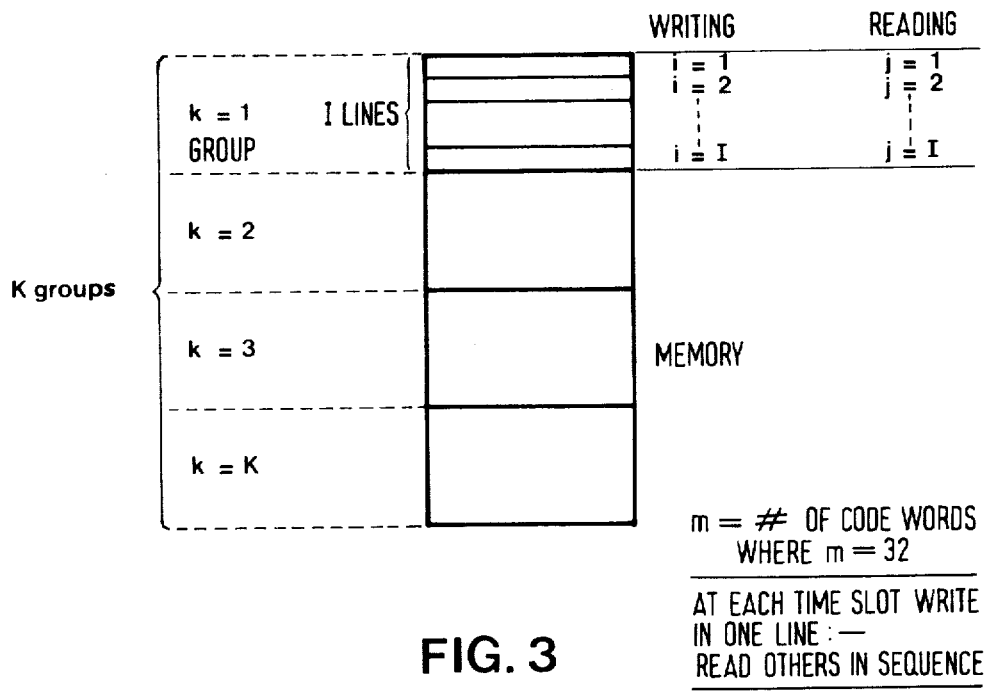
FIG. 3 shows the organization of the conference circuit memory.

For a clearer understanding, the organization of memory 3 will be explained by the use of FIG. 3. This memory of m lines is divided into K groups of I consecutive lines ($m = K \cdot I$), each group being identified by the letter k (with $k = 1$ to K). Each of these K groups permits a conference call between I subscribers to be established. Various distributions are possible; let us take, for example, the case in which $m = 32$. There can be:

eight conferences ($K = 8$) with four subscribers ($I = 4$);

four conferences ($K = 4$) with eight subscribers ($I = 8$);

two conferences ($K = 2$) with 16 subscribers ($I = 16$);

one conference ($K = 1$) with 32 subscribers ($I = 32$).

At each time slot t, a coded word will be written on one line of one group of the memory while all the other lines of this same group will be read in order to make an addition. For the write operations, the different lines will be identified by the letter i within a given group k (with $i = 1$ to I), and by the letters, k,i within the memory. For the read operations, they will be indentified by the letter j (with $j = 1$ to I) within a given group k, and by the letters k,j within the memory. We shall call $t_{k,i}$ the successive time slots t of a frame T. Thus, during the time slot $t_{k,i}$, the line k,i of the memory is written while the I lines k,j are read. The address of the memory is therefore given by k,j at a rate I times faster than the writing that is to say a periods $t/I$; j changes I times faster than i, and i changes I times faster than k.

Returning to FIG. 2, memory 3 is addressed cyclically by the code of k,j. It operates in conventional manner: simple addressing permits the reading of the corresponding line, whereas this line is written by the presence of a logical signal at the write input called E.

Figure 4:
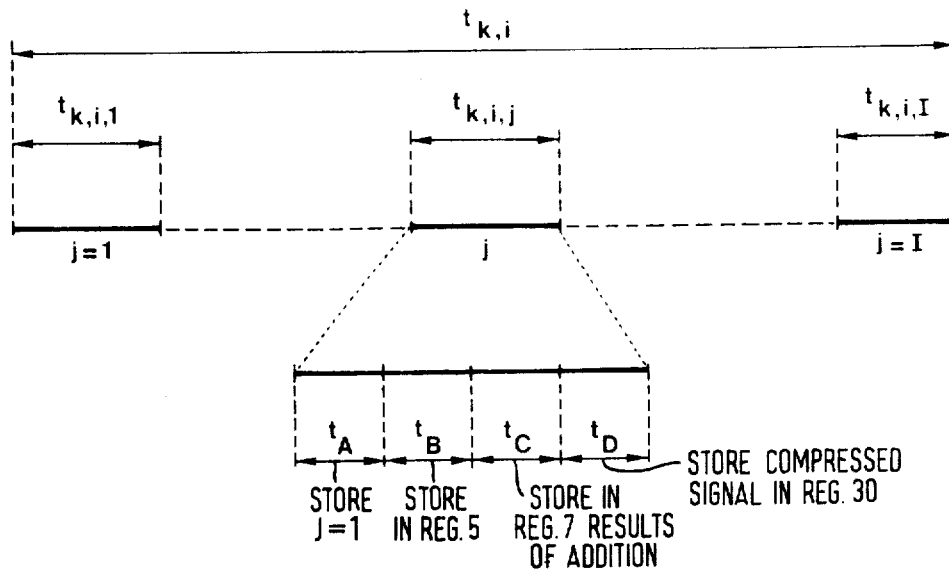
FIG. 4 is a time diagram helpful in understanding the operation of the conference circuit.

The operation of the conference circuit in FIG. 2 will now be explained, in connection with the time diagram shown in FIG. 4. Each time slot $t_{k,i}$ is divided into I equal elementary times $t_{k,i,j}$, each corresponding to the time of the presence of an address k,j at memory 3. Each elementary time $t_{k,i,j}$ is in its turn divided into four fine times $t_A$, $t_B$, $t_C$, $t_D$. This number four is just an example, but another configuration could easily be used, depending upon the requirements and general lay-out of the switching center.

We shall call:

P a control signal present when $j = 1$;

Q a control signal present when $j = I$;

N a control signal present when $j = i$.

We shall assume for the moment that $j \neq i$.

At the fine time $t_A$ of the first elementary time $t_{k,i,I}$ (that is to say for $j = 1$), the coded words present at the input of the conference circuit is stored in input register 1 under the control of the logical signal $P \cdot t_A$.

At the fine time $t_B$ of this first elementary time, the word of line k,j is stored in buffer register 5 under the control of the logical signal $\overline{N} \cdot t_B$. Buffer register 8 is simultaneously reset under the control of the logical signal $P \cdot t_B$, so that the add operation starts from zero, ignoring the results obtained previously.

At the fine time $t_C$ of this same elementary time $t_{k,i,I}$, the result of the addition is stored in buffer register 7 under the control of time signal $t_C$.

During the following elementary times (still assuming that $j \neq i$), the input register 1 will remain blocked. At fine time $t_B$, buffer register 5 stores the word of the addressed memory line. Buffer register 8 simultaneously stores the result of the preceding addition under the control of the logical signal $\overline{P} \cdot t_B$.

At the fine time $t_D$ of the last elementary time $t_{k,i,I}$ (that is to say for $j = I$), the code of the addition present at the output of buffer register 7 is, after compression in circuit 9, stored in the output register 30 under the control of the logical signal $Q \cdot t_D$.

If we now consider the case $j = i$, buffer register 5 will be reset at fine time $t_B$ under the control of the logical signal $N \cdot t_B$. The result of the addition will therefore be indentical to the preceding result. At fine time $t_C$, the word stored in the input register 1 since the beginning of the time slot $t_{k,i}$ in question is written on line k,i of memory 3 under the control of the logical signal $N \cdot t_C$.

Thus, at each time slot $t_{k,i}$ reserved for the two-way communication of a subscriber, the conference circuit receives a coded word from this subscriber and delivers to him the sum of the most recently coded words of the other subscribers participating in the same conference. The resetting of buffer register 5 for $j = i$ prevents this subscriber from receiving his own speech.

Figure 5:
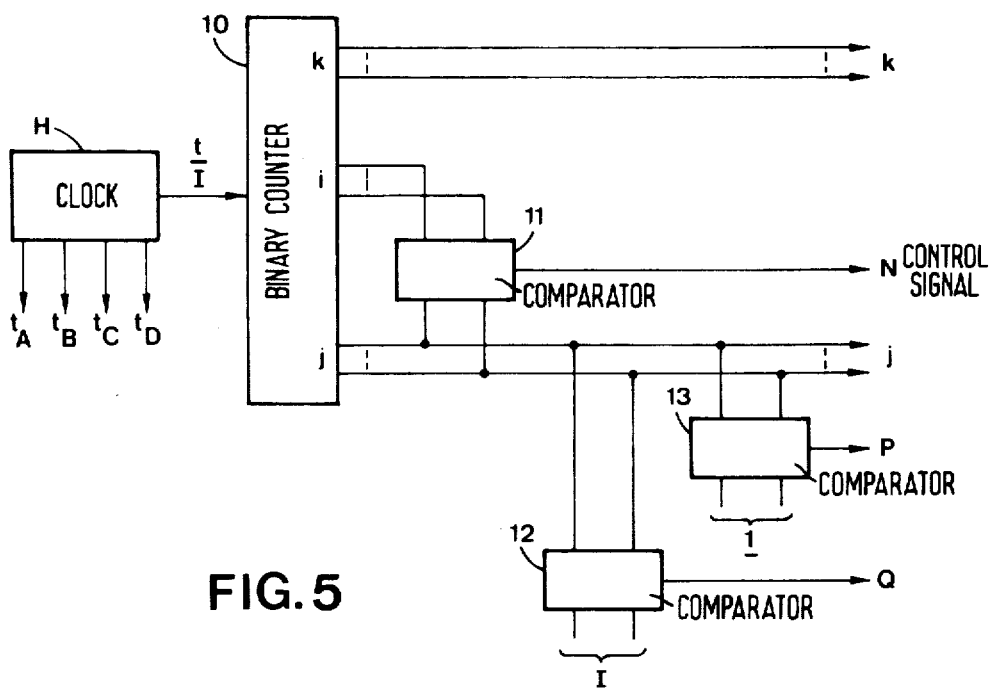
FIG. 5 shows an example of circuits delivering cyclical signals required in the operation of the conference circuit.

FIG. 5 shows a particular example of circuits delivering addresses k,j of the memory as well as the control signals N, P and Q, for a case in which K and I are powers of two. A binary counter 10, operated by clock pulses of period $t/I$, delivers the codes of j,i and k simultaneously. The lowest order outputs correspond to j whereas the highest order outputs correspond to k. The said clock pulses come from a clock H also delivering the fine time signals $t_A$ to $t_D$. A first comparator 11 receives the i and j codes. It delivers the control signal N when $i = j$. A second comparator 12 receives on the one hand the j code and on the other hand the code corresponding to *I*. It delivers the control signal Q when *j* = *I*. A third comparator 13 receives the *j* code as well as the code corresponding to the digit 1. It delivers the control signal P when *j* = 1.

Figure 6:
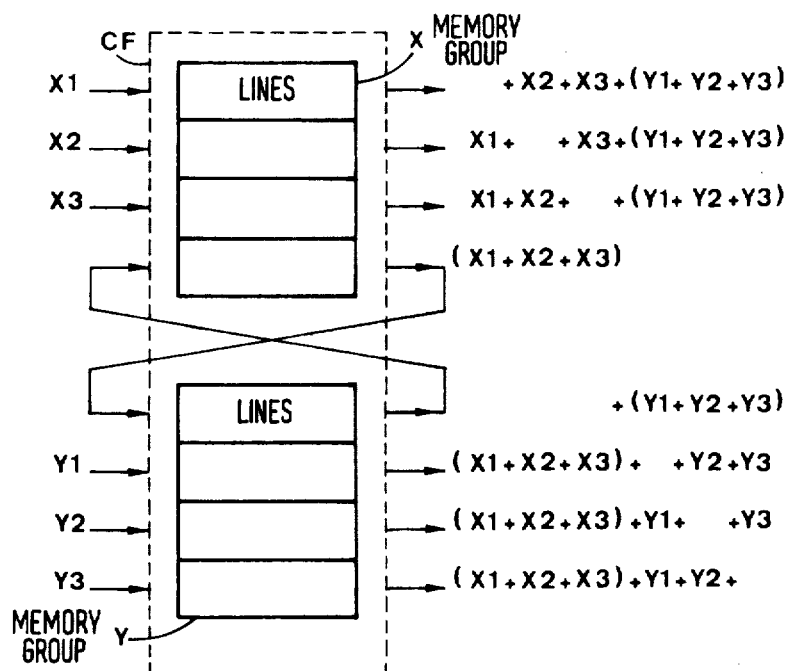
FIG. 6 shows the lay-out of several groups in the memory, in order to increase the number of subscribers involved in the same conference.

Until now, we have contemplated as many simultaneous conferences as there are groups in the memory, the number of subscribers involved in a conference being limited to the number of lines contained in each group. The conference circuit according to the invention also permits, if the appropriate connections are established in the space-time switch, to increase the number of subscribers involved in the same conference by using several groups of the memory for this same conference, with, of course, a smaller number of simultaneous conferences. This possiblity is illustrated in FIG. 6 which shows, as an example, the connections to be made to obtain a conference between six subscribers by associating two memory groups X and Y, each having four lines. The conference circuit CF receives, during different time slots, the coded words X1, X2, X3, and Y1, Y2, Y3 coming from the six subscribers through the switch. Each of the words X1, X2, and X3 is stored on a particular line of group X. Likewise, each of the words Y1, Y2 and Y3 is stored on a line of group Y. The remaining free line of group X will receive, by means of appropriate connections in the switch, the coded word delivered by the conference circuit CF during a time slot. This is the write time slot of the remaining free line of group Y. Likewise, this free line of group Y will receive, by means of appropriate connections in the switch, the coded word delivered by the conference circuit CF during a given time slot, which is the write time slot of the free line of group X. It is therefore possible to associate several memory groups by looping the output of the conference circuit back to the input, through the switch.

Figure 7:
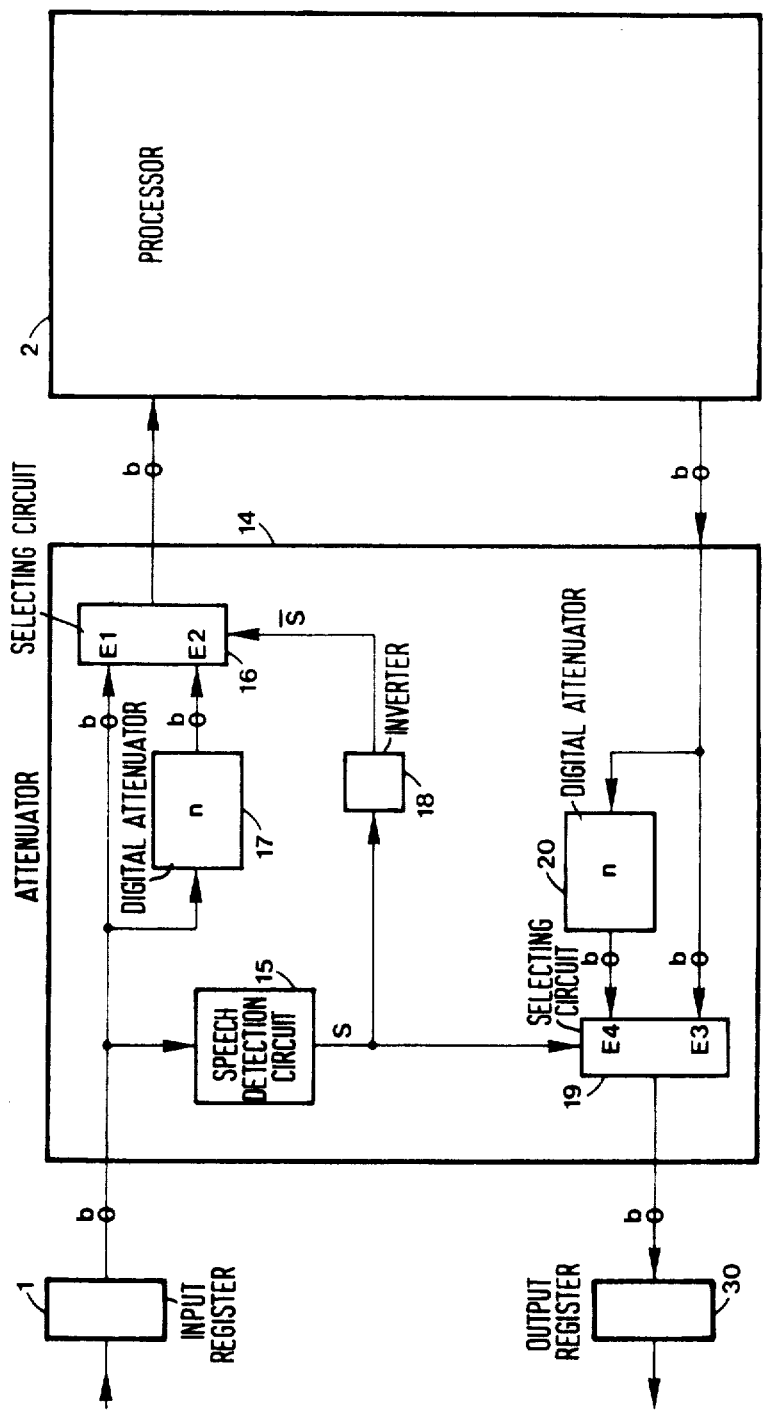
FIG. 7 shows the conference circuit according to the invention, equipped with an attenuation device.

FIG. 7 shows the conference circuit according to the invention, equipped with an attenuation device 14 permitting the electrical noise generated by the circuits of each subscriber to be attenuated; actually, in the case of a conference, each subscriber receives not only the sum of the speech samples of the other subscribers, but also the sum of the electrical noise generated by the electrical circuits of the other subscribers, which can make listening much more difficult. The attenuation device is inserted between the input and output registers 1 and 30 on the one hand and the processing circuit 2 on the other hand. It contains a speech detection circuit 15, of a known type, receiving the codes delivered by the input register 1. It delivers a logical signal S of level 1 when the value of the received code persists in being higher than a given threshold for a given time, and of level 0 when the value of the received code persists in being lower than the said threshold for a given time. This condition of persistence prevents the output of the speech detector from changing logical state within a short time of silence, always present between two words or two groups of words. A selecting circuit 16 with two inputs E1 and E2 receives at the first input E1 the coded words delivered by the input register 1, and at the other input E2 these same coded words, but attenuated by a factor *n* through a digital attenuator 17. The control input of the selecting circuit 16 is connected through an inverter 18 to the output of the speech detector. A selecting circuit 19 with two inputs E3 and E4 receives an input E3 the coded words delivered by the processing circuit 2, and at the other input E4 these same coded words, but attenuated by the factor *n* by means of a digital attenuator 20. The control input of the selecting circuit 19 is connected directly to the output of the speech detector 15. The digital attenuators can consist in ROM memories addressed by the coded words to be attenuated.

When a subscriber is speaking, a logical level 1 is present at the output of the speech detector 15, the effect of this level being to select input E1 of selecting circuit 16 and input E4 of selecting circuit 19. Thus, the coded words received from this subscriber will not be attenuated before entering the processing circuit 2, and the coded words sent to this subscriber will be attenuated by *n* at the output of the processing circuit 2.

When a subscriber is not speaking, a logical level 0 is present at the output of the speech detector 15, the effect of this level 0 being to select input E2 of the selecting circuit 16 and input E3 of the selecting circuit 19. The coded words received from this subscriber will be attenuated by *n* before entering the processing circuit 2, and the coded words sent to this subscriber will not be attenuated at the output.

Thus, a subscriber who is not speaking will receive without attenuation the signal from the other subscribers who are speaking. He will receive, with an attenuation of *n*, the signal (noise) of the other subscribers who are not speaking. A subscriber who is speaking will receive with an attenuation of *n* the signal of the other subscribers who are speaking; if *n* is ranging about 15 dB, this signal will be attenuated, but will nevertheless remain loud enough to be heard (a necessary condition in order to know if other subscribers start to speak. This subscriber will receive with an attenuation of $n^2$ the signal (noise) of the other subscribers who are not speaking; this signal will be too weak to be heard.

Although this invention has been described with a particular embodiment, it is clearly not limited to the said example and is capable of variants or modifications still lying within its scope.

I claim:

1. A conference circuit for interconnecting plural subscribers within a PCM switching network having a predetermined frame repetition rate comprised of a plurality of successive time slots, the invention including: memory means for storing non-linear coded data received from subscribeers during time slots allotted to the respective subscribers, expander means receptive of coded data received from said memory means, for expanding the received data, adder means for receiving expanded data and for combining the expanded data with data fed back from the output of the adder means, and further means for compressing linear data received from the adder means, wherein said memory means comprises a read/write memory comprised of a memory line for each subscriber served, the lines of said memory means being grouped into plural groups of consecutive time slots with the number of groups corresponding to the number of simultaneous conferences possible and the number of lines per group corresponding to the maximum number of subscribers per conference, means for writing into said memory means at the rate of one line per time slot, and means for successively reading the lines of an entire group during one time slot.

2. A conference circuit according to claim 1, wherein said adder means has two inputs, one of which is connected to the output of the memory through said expander means while the other input is connected to its own output through first and second buffer registers controlled with a time shift, the said second buffer register being reset at each time slot.

3. A conference circuit according to claim 2, wherein one buffer register at the output of the said memory is reset when the address present at the memory corresponds to the address of the line to be written.

4. A conference circuit according to claim 3, further including an attenuation device for attenuating the codes at the input only for subscribers whose lines indicate a silent condition and for attenuating the added codes at the output only for subscribers whose lines exhibit a speech condition.

5. A conference circuit according to claim 4, wherein said attenuation device includes a speech detector connecting a first attenuator to the input of the conference circuit when the received codes correspond to a silent condition, and connecting a second attenuator to the output of the conference circuit when the received codes correspond to a speech condition.

* * * * *